(12) United States Patent
Volpe et al.

(10) Patent No.: US 10,802,828 B1
(45) Date of Patent: Oct. 13, 2020

(54) INSTRUCTION MEMORY

(71) Applicant: Amazon Technologies, Inc., Seattle, WA (US)

(72) Inventors: Thomas A. Volpe, Austin, TX (US); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 65 days.

(21) Appl. No.: 16/145,126

(22) Filed: Sep. 27, 2018

(51) Int. Cl.
*G06F 9/32* (2018.01)
*G06F 13/28* (2006.01)

(52) U.S. Cl.
CPC ............. *G06F 9/322* (2013.01); *G06F 13/28* (2013.01); *G06F 2213/28* (2013.01)

(58) Field of Classification Search
CPC ........................................ G06F 9/322
See application file for complete search history.

(56) References Cited

U.S. PATENT DOCUMENTS

| | | | |
|---|---|---|---|
| 4,724,521 A | 2/1988 | Carron et al. | |
| 5,603,063 A * | 2/1997 | Au | G06F 3/0601 710/52 |
| 5,652,903 A | 7/1997 | Weng et al. | |
| 5,715,440 A | 2/1998 | Ohmura et al. | |
| 5,822,612 A * | 10/1998 | Thomas | H04Q 11/0478 710/6 |
| 6,170,003 B1 * | 1/2001 | Benkual | H04L 29/06 709/214 |
| 6,263,427 B1 | 7/2001 | Cummins et al. | |
| 6,647,484 B1 | 11/2003 | Jiang et al. | |
| 7,272,704 B1 | 9/2007 | Nguyen et al. | |
| 2004/0078553 A1 * | 4/2004 | Hussain | G06F 9/3853 712/214 |
| 2008/0005534 A1 | 1/2008 | Jourdan et al. | |
| 2011/0119526 A1 * | 5/2011 | Blumrich | G06F 15/17381 714/16 |
| 2015/0212820 A1 | 7/2015 | Wiencke et al. | |

OTHER PUBLICATIONS

U.S. Appl. No. 16/146,657, U.S. Patent Application, "Instruction Memory With Branch Instructions," filed Sep. 28, 2018.

* cited by examiner

*Primary Examiner* — Farley Abad
(74) *Attorney, Agent, or Firm* — Kilpatrick Townsend & Stockton LLP

(57) ABSTRACT

Provided are systems and methods for implementing a memory for an integrated circuit device. In various examples, the integrated circuit can operate the memory as a FIFO, where each address in the FIFO is directly addressable. The integrated circuit can include a first register for storing a head pointer and a second register for storing a tail pointer. When new data is written to the memory, the data cat be written starting at the tail pointer location, without the tail pointer being modified. The tail pointer can be incremented using write transactions received from external to the integrated circuit.

23 Claims, 8 Drawing Sheets

500

Receiving a write transaction for writing a set of data to a memory of the integrated circuit, and wherein the integrated circuit stores a head pointer and a tail pointer, the head pointer and the tail pointer each referring to addresses in the memory; and wherein the memory is directly addressable
502

Sequentially writing the set of data to the memory, wherein a first data from the set of instructions is written to a first address of the memory, wherein the tail pointer is not modified as a result of writing the set of data
504

Receiving a transaction for updating the tail pointer, the transaction including a value
506

Incrementing the tail pointer by a number of addresses equaling the value, wherein, after being incremented, the tail pointer refers to a second address
508

Determining that a head pointer is referring to an address other than the second address
510

Initiating a read of data at the address referred to by the head pointer
512

Incrementing the head pointer to refer to a next address
514

FIG. 5

INSTRUCTION MEMORY

BACKGROUND

In a computing system, program code that is going to be executed by, or is being executed by, a processor is stored in a memory. The processor can read an instruction from the memory, then decode and execute the instruction. When the processor is to execute multiple programs, or executes the same program more than once, the code for each of these programs is stored in the same memory. The processor can therefore include circuitry for managing the memory, including determining where in the memory instructions for any particular program is to be stored, and from where a next instruction is to be read.

BRIEF DESCRIPTION OF THE DRAWINGS

Various embodiments in accordance with the present disclosure will be described with reference to the drawings, in which:

FIG. 5 is a flowchart that illustrates an example of a process for operating an integrated circuit;

DETAILED DESCRIPTION

Figure 1:
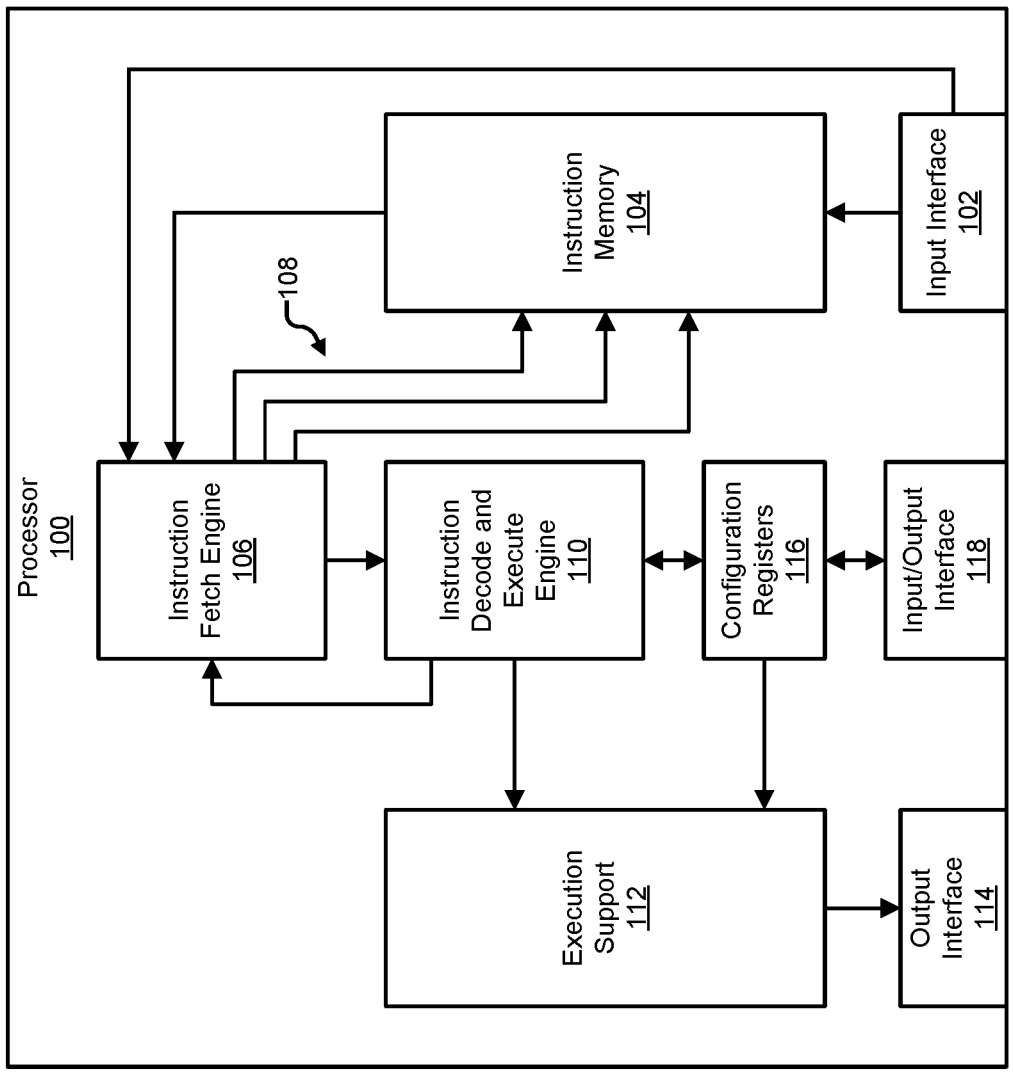
FIG. 1 is a block diagram illustrating an example of a processor for managing the movement of data in a computing system.

General purpose processors, which can also be referred to central processing units (CPUs), can be very flexible and powerful in terms of the functionality that such processors offer. For example, general purpose processors can provide a wide array of instructions and computations, and can be capable of managing computing systems ranging from a small system including a small amount of memory, a few peripheral devices, and executing single-user programs to a large system with many peripheral devices and network connections, simultaneously executing many programs for many users.

General purpose processors, however, can also be both large and complex, and can have high power requirements. Additionally, program execution can require a general purpose processor, and/or subsidiary systems such as a Direct Memory Access (DMA) controller, to manage the processor's instruction memory, including tracking free space and used space and writing new program code into the free space. Additionally, the processor's instruction memory can be augmented by caches into which frequently used or recently used program code can be stored, and which also require management by the processor or other systems.

In some applications, the power and complexity of a general purpose processor is not needed. For example, in many computing systems, one operation that can consume much of the time of the system's primary processor (e.g., the CPU), is the movement of data within the system. Data movement within the system can include, for example, moving data between network interfaces, hard drives, graphics accelerators, floating point accelerators, neural network processors, and processor memory, among other locations. While the computing system can include a DMA engine that can perform much of the work of copying data from one location to another, thereby offloading these operations from the primary processor, the processor nevertheless may need to manage the operations of the DMA engine. When the system includes many consumers of data and many DMA engines to keep the data consumers occupied, management of movement of data in the system can occupy a significant portion of the primary processor's time.

In various implementations, provided are systems and methods for implementing a processor for managing the movement of data in a computing system. The processor can be implemented, for example, using an integrated circuit device. In various examples, a processor for managing data movement can offload these operations from a general purpose processor in the system. Additionally, the data management processor can be significantly simpler than the general purpose processor, so that the data management processor can require less die area, have lower power requirements, and can require little management of the memory in which the processor's instructions are stored.

In various implementations, a data management processor can include an instruction memory that operates as a first-in, first-out (FIFO) type of memory while, at the same time, each address in the memory is directly addressable. For example, as a FIFO, the processor can maintain a head pointer and a tail pointer for the memory, where the head pointer points to an address in the memory where a next instruction to execute is located, and the tail pointer points to an address where additional instructions can be written to the memory. As a further example, the processor can read instructions using the head pointer and then increment the head pointer to the next address, until the head pointer is pointing to the same address as the tail pointer, at which point the processor can stop executing instructions until more instructions are written to the memory.

Unlike a FIFO, however, the instruction memory is directly addressable, so that the memory can accept writes at any address, rather than only at the tail pointer. Direct addressability gives the data management processor programming flexibility, including the ability to pre-load a number of instructions without the processor immediately beginning execution of these instructions. As with a FIFO, the processor can begin executing instructions once the head pointer no longer points to the same address as the tail pointer.

In various examples, the instruction memory can also be indirectly addressable. Indirect addressability, in this context, means that a base address, which may map to an indirect address zero, for example, always corresponds to the address pointed to by the tail pointer, regardless of the location of the tail pointer. Indirect addressability enables new program code to be written to the instruction memory without needing to keep track of the location of the tail pointer. For example, new code can be written to indirect address zero at any time. In this and other examples, the data management processor can map indirect address zero and any address offset from indirect address zero to a corresponding address that is relative to the address pointed to by the tail pointer.

An instruction memory implemented as a FIFO that is also directly addressable can simplify both the loading of program code into the memory and the reading of the program code from the memory. This simplification removes the need for operations such as tracking free and used memory space and caching. The data management processor can thus be used more efficiently to manage the movement of data in a computing system.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

FIG. 1 is a block diagram illustrating an example of a processor 100 for managing the movement of data in a computing system. In some examples, the processor 100 can also be referred to as a data management processor or a streaming processor. In various examples, the processor 100 can be implemented using an integrated circuit device, such as an Application Specific Integrated Circuit (ASIC), a Field Programmable Gate Array (FPGA) or a similar integrated circuit device. In some examples, the processor 100 can be incorporated into a larger integrated circuit device. For example, the processor 100 can be a component in a System on a Chip (SoC).

In various examples, the processor 100 can be included in a computing system. The computing system can further include a general purpose processor (which can be referred to as the primary processor or the host processor), accelerator engines, various peripheral devices, and a communication fabric over which the components of the computing system can communicate. The general purpose processor can be responsible for overall management of the computing system's operations, including the operation of the processor 100. For example, the general purpose processor can execute a device driver or driver program that controls the processor 100. The computing system can further include various memories, such as processor memory for use by the processor and additional memories for use by the accelerators. In various examples, program code executed by the processor 100 can coordinate the movement of data between the various memories and the accelerators, as well as other components of the computing system.

In the example illustrated in FIG. 1, the processor 100 includes an input interface 102, an instruction memory 104, an instruction fetch engine 106, an instruction decode and execute engine 110, various execution support 112 circuitry, and an output interface 114. The processor 100 further includes configuration registers 116 and a combined input/output interface 118 that can provide an alternative interface for exchanging data with other components in the computing system.

In various examples, the input interface 102 provides the processor 100 with the ability to receive data from other components in the computing system. The data can include program code and other data. For example, a driver program that controls the operation of the processor 100 can cause program code to be written to the processor 100, which is received at the input interface 102. As a further example, the driver program can also issue a write transaction to update the value of the instruction memory's tail pointer (which is discussed further below), and this write transaction can be received at the input interface 102. The input interface 102 can be implemented, for example, as an Advanced Extensible Interface (AXI) slave interface, for when the computing system's communication fabric includes an AXI bus structure. In various examples, other bus structures and bus protocols can be used.

In addition to or instead of the driver program, in some examples, program code can be written to the instruction memory 104 by a DMA engine. In these examples, data being written by the DMA engine can also be received at the input interface 102.

In various examples, the instruction memory 104 can be implemented as a circular, first-in, first-out (FIFO) type of memory. As such, instructions are written to the instruction memory 104 sequentially, and are read from the instruction memory 104 in the order in which the instructions were written. Additionally, the last address in the instruction memory 104 is treated as sequential to the first address in the instruction memory 104. For example, if the instruction memory 104 has 1024 addresses, the instruction at address zero is the next instruction read after the instruction at address 1023.

In various examples, the instruction memory 104 can be directly addressable, meaning that each address in the instruction memory 104 can be written to at any time, regardless of the locations of the pointers 108. Being directly addressable means that writes to the instruction memory 104 can occur at any address, and not only at the address pointed to by the tail pointer. Directly addressability can give software using the processor 100, such as the processor's device driver, a great degree of flexibility in loading code in the processor 100. In some examples, the instruction memory 104 can, alternatively or additionally, be indirectly addressable, as discussed further below.

To determine where instructions should be written to and read from, the instruction fetch engine 106 can maintain a set of pointers 108, including a head pointer and a tail pointer. The head pointer can point to an address in the instruction memory 104 from which the instruction fetch engine 106 will read the next instruction. The tail pointer can point to an address in the instruction memory 104 at which to write new instructions. In some examples, the instruction fetch engine 106 can also maintain a completion pointer, which points to an address, in the instruction memory, of the most recent instruction that has been executed by the instruction decode and execute engine 110. To maintain the pointers 108, the instruction fetch engine 106 can, for example, include a register for each pointer, where the registers store the address a pointer is pointing to or an offset from the beginning of the instruction memory 104 at which the address being pointed to is located. In some examples, the head pointer can be read from external to the processor 100 (e.g., using a read transaction received at the input interface 102) but cannot be written to from external to the processor 100.

In various examples, the instruction fetch engine 106 does not modify the tail pointer when instructions are written to the instruction memory 104. In other FIFO implementations, data is written at the tail pointer and the FIFO automatically increments the tail pointer, so that the tail pointer always points at the next available memory position in the FIFO. In various examples, the instruction memory 104 is not operated in this manner. Instead, software (e.g., the driver program) can write any number of instructions to the instruction memory 104, and the instruction fetch engine 106 will not modify the tail pointer. In these and other examples, software increments the tail pointer by writing an increment value to the processor 100. For example, the instruction fetch engine 106 or the configuration registers 116 can include an address at which the increment value can be written. Upon receiving the increment value, the instruction fetch engine 106 can add the value to the tail pointer, which moves the tail pointer by a number of addresses equaling the increment value. The increment value can be provided as, for example, a number of address, a number of bytes, or a number of another type. In these and other examples, software does not directly modify the tail pointer by providing a new address, and instead modifies the tail pointer indirectly.

As an example, the instruction memory 104 can be 64 kilobytes (KB) in size, and be logically organized with 32-bit words (e.g., each addressable location stores 32 bits). In some examples, the instruction memory 104 can be protected using Single-Error Correcting and Double-Error Detecting (SECDED) Error Correcting Code (ECC). In some examples, read and write transfers have lengths in multiples of four bytes, and are 4-byte aligned, or else the transactions do not complete and the processor 100 responds at the input interface 102 with an error.

In various examples, the instruction fetch engine 106 reads instructions from the instruction memory 104 and provides the instructions to the instruction decode and execute engine 110. The instruction fetch engine 106 can begin reading instructions whenever the head pointer is not equal to the tail pointer (e.g., the address pointed to by the head pointer is not the same as the address pointed to by the tail pointer). Once the instruction fetch engine 106 has read an instruction from the instruction memory 104, the instruction fetch engine 106 can increment the head pointer by one address.

In various examples, the instruction decode and execute engine 110 decodes instructions read from the instruction memory 104 and executes the instructions. The instructions can, for example, cause the instruction decode and execute engine 110 to initiate the movement of data from one location in the computing system to another (e.g., from a memory to an accelerator), wait on a timer, wait on an event, write a notification to a memory location, or trigger an interrupt, among other operations. These and other operations can be aided by the execution support 112, which can include memories, buffers, counters, and other circuitry for performing operations dictated by the instructions. For example, the execution support 112 can include a queue for transactions to be output through the output interface 114, and circuitry for managing various outgoing transactions that can be generated by the instruction decode and execute engine 110 or the execution support 112.

In various examples, the output interface 114 provides the processor 100 with an interface through which the processor 100 can output data to other components in the computing system. The output interface 114 can, for example, connect to a communication fabric in the computing system. The output interface 114 can be implemented, for example, as an AXI master interface, for connecting to an AXI bus structure. In various examples, other bus structures and bus protocols can be used.

In various examples, the configuration registers 116 enable certain operations of the processor 100 to be modified when the processor 100 is in operation, and/or can provide a place from which information about the processor 100 can be read. For example, the configuration registers 116 can include registers for enabling or disabling interrupts that can be generated from the processor 100, enabling or disabling notifications that can be generated from the processor 100, setting the memory location of notification queues, and other configuration settings. The configuration registers 116 can further include, for example, registers from which a current execution state, current timestamp, and/or statistics, or other data, can be read.

In various examples, the configuration registers 116 can be read from and written to through a combined input/output interface 118. The combined input/output interface 118 can provide the processor 100 with an alternate communication path to other components in the system. This path can be slower than the paths used by the input interface 102 and the output interface 114, or may provide a more direct connection to the primary processor. In some examples, the combined input/output interface 118 is optional, and the processor 100 receives transactions for the configuration registers 116 at the input interface 102, and sends data from the configuration registers 116 out through the output interface 114.

Figure 2:
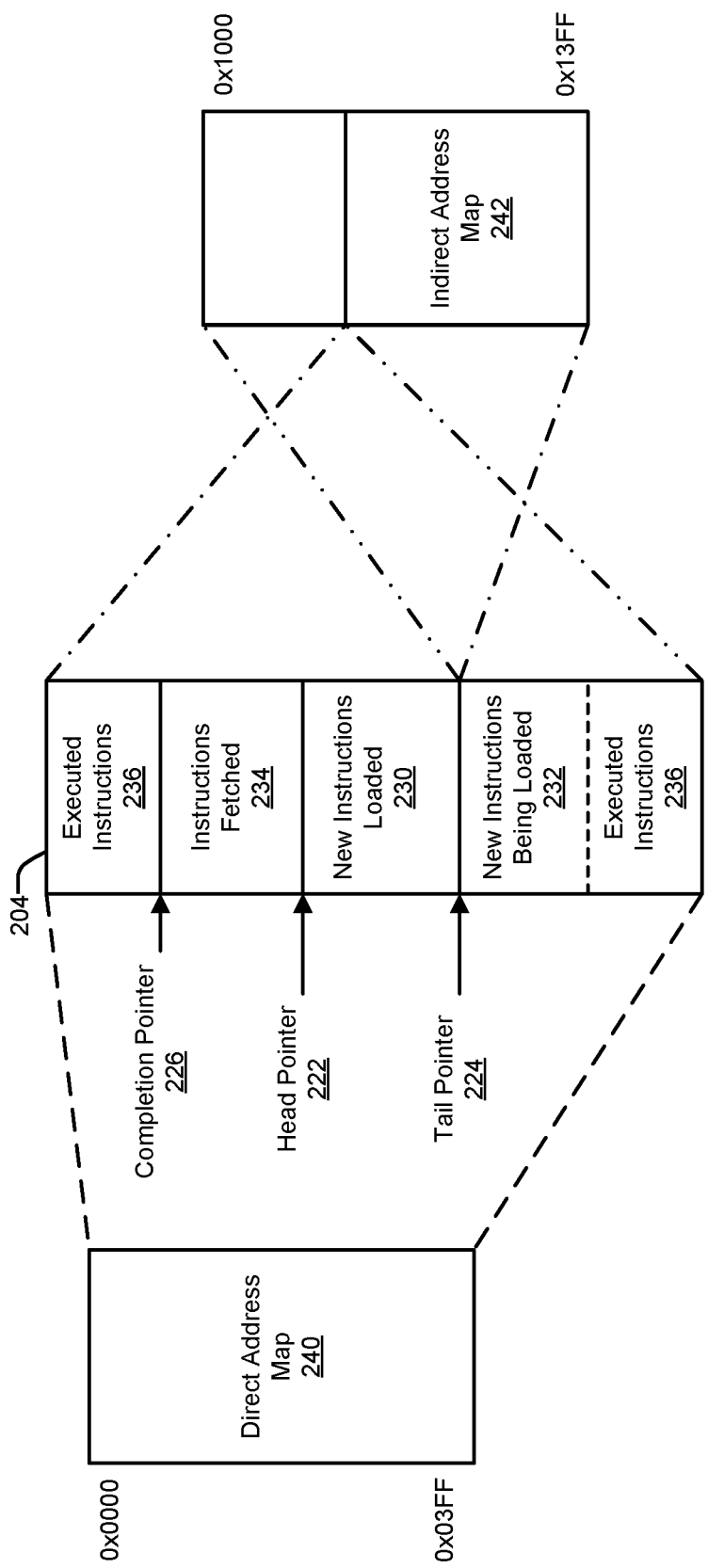
FIG. 2 includes a diagram that illustrates, in greater detail, the instruction memory.

FIG. 2 includes a diagram that illustrates, in greater detail, the instruction memory 204, the operation of the instruction memory 204, and ways in which the instruction memory 204 can be addressed. In various examples, the instruction memory 204 operates as a circular FIFO, and, as such, a set of pointers is maintained for the instruction memory 204. As illustrated in FIG. 2, the pointers can include a head pointer 222, a tail pointer 224, and a completion pointer 226. In various examples, an integrated circuit (such as the instruction fetch engine illustrated in FIG. 1) manages the pointers, including storing values indicating the addresses to which the pointers are referring. The values stored can be, for example, an address in the instruction memory 204 illustrated in FIG. 2, or an offset from the beginning of the instruction memory 204, or another value. Other management operations that can be performed by the integrated circuit can include writing new instructions to the instruction memory 204, reading instructions, and checking transactions for errors in transactions address to the instruction memory 204.

Management of the pointers can include incrementing the pointers and ensuring that the pointers are valid. Incrementing the pointers includes wrapping a pointer around back to the first address in the instruction memory 204 when a pointer reaches the last address in the instruction memory 204. That is, when, for example, the last address in the instruction memory 204 is hexadecimal 0x03FF and incrementing a pointer by one address would result in non-existent address 0x1000, the pointer is instead set to point to address zero. In some cases, ensuring that the pointers are valid can include ensuring that the head pointer 222 does not advance past the tail pointer 224, and ensuring that the completion pointer 226 does not advance past the head pointer 222.

In the discussion that follows, addresses that are "after" or "before" a particular pointer can have a value that is either greater than or less than the address being pointed to by the pointer. Thus, the terms "after" and "before" are to be understood with reference to at least two pointers, with the order of the pointers being significant. For example, addresses from the head pointer 222 to the tail pointer 224 are "after" the head pointer 222 and "before" the tail pointer 224, while addresses from the tail pointer 224 to the head pointer 222 are "after" the tail pointer 224 and "before" the head pointer 222, with the understanding one or the other range of address can include a block of addresses at the end of the instruction memory 204 and at the beginning of the instruction memory 204. As a further example, addresses from the completion pointer 226 to the head pointer 222 are "after" the completion pointer 226, while addresses from the tail pointer 224 to the 226 are "before" the completion pointer 226.

When the instruction memory 204 is initialized or reset, or the instruction memory 204 has no instructions to read, the head pointer 222 and the tail pointer 224 point to the same address. When program code is loaded into the instruction memory 204, software can use the address pointed to by the tail pointer as the first address into which to write instructions. In contrast to other FIFO implementations, the circuit that manages the instruction memory 204 does not automatically increment the tail pointer 224 when data is written to the instruction memory 204, and instead leaves the tail pointer 224 unchanged. Because writing to the instruction memory 204 does not move the tail pointer 224, multiple write transactions can write instructions to the instruction memory 204 without triggering the management circuit to start reading instructions. This feature can be used, for example, to pre-load program code into the instruction memory 204. As another example, this feature enables blocks of data to be written into the instruction memory 204, as may occur when a DMA engine writes a block of data into the instruction memory 204. In various examples, software can further choose to overwrite pre-loaded program code with different code before execution of any code begins.

Addresses after the tail pointer 224 thus can include new instructions being loaded 232 that have not yet been read or executed. The new instructions being loaded 232 can include any number of new instructions. Regardless of the number new instructions written after the tail pointer 224, however, the tail pointer 224 continues to point to the same address. When no new instructions have been loaded, the addresses after the tail pointer 224 can include executed instructions 236 or not-yet-used addresses.

In various examples, the tail pointer 224 is updated by a write transaction to a register or memory location for this purpose. The management circuit, for example, can include a register that, when written to, causes the tail pointer 224 to be updated. In various examples, software, such as a driver program, executes the write transaction for incrementing the tail pointer 224. In these and other examples, the write transaction can supply a value that indicates by how many addresses the tail pointer 224 should be advanced. The value can be provided as a count of addresses, a number of bytes, or in another form. In various examples, the management circuit does not allow the tail pointer 224 to be modified directly.

Once the tail pointer 224 does not equal the head pointer 222 (e.g., the tail pointer 224 and the head pointer 222 point to different addresses), the addresses between the head pointer 222 and the tail pointer 224 include new instructions loaded 230 into the instruction memory 204, but not yet executed. Upon determining that the head pointer 222 and the tail pointer 224 are different, the management circuit (or another circuit) can read an instruction from the address pointed to by the head pointer 222, and hand the instruction over to a circuit (such as the instruction decode and execute engine illustrated in FIG. 1) that can decode and execute the instruction. Once the management circuit reads an instruction at the head pointer 222 illustrated in FIG. 2, the management circuit can increment to the head pointer 222 by one address, to point at the address that follows the address that was just read.

In some examples, an instruction is read from the instruction memory 204 and execution of the instruction completes several clock cycles later. Alternatively or additionally, in some examples, the management circuit pre-fetches instructions from the instruction memory 204, meaning that the management circuit reads one or more instructions and expects these instructions to be executed at a later time. In these and other examples, the management circuit uses the completion pointer 226 to keep track of instructions fetched 234 that have not yet been executed. Address locations between one pointed to by the completion pointer 226 and one pointed to by the head pointer 222 can include the instructions fetched 234 that have not yet been executed. In various examples, once an instruction is fully executed, the management circuit is informed, and the management circuit can advance the completion pointer 226 by an address. In some examples, when multiple instructions have been fully executed, the management circuit can advance the completion pointer 226 by multiple addresses.

The completion pointer 226 can be used as a stopping point for the tail pointer 224, so that the tail pointer 224 cannot be advanced past the completion pointer 226. The completion pointer 226 can thus preserve the instructions fetched 234, in case, for example, these instructions are to be executed again. In some examples, the completion pointer 226 is omitted, and address locations before the head pointer 222 are considered as storing executed instructions 236.

Addresses that are before the completion pointer 226 (or before the head pointer 222 when there is no completion pointer 226) can include executed instructions 236; that is, instructions that have been read and fully executed. In some cases, software (such as a driver program) may be done with the executed instructions 236, and thus can cause the executed instructions 236 to be overwritten by the new instructions being loaded 232. Alternatively, software can determine to execute some or all of executed instructions 236 again, and can thus increment the tail pointer 224 so that the executed instructions 236 are included among the new instructions loaded 230.

The tail pointer 224 indicates the point at which reading of instructions should stop. Thus, once the head pointer 222 has been incremented to the same address as is pointed to by the tail pointer 224, and an instruction has been read from the address, the management circuit will stop reading instructions from the instruction memory 204. This is the case even when there are additional instructions after the tail pointer 224.

In various examples, the instruction memory 204 can be addressed in one or both of two ways: first, using a direct address map 240, and second, using an indirect address map 242. The direct address map 240 enables each address in the instruction memory 204 to be read or written. The direct address map 240 distinguishes the instruction memory 204 from other FIFO implementations. In other FIFO implementations, data is written to the FIFO by writing to a fixed address, which maps to the tail pointer, and data is read from a fixed address, which maps to the head pointer. In contrast, through the direct address map 240, any address in the instruction memory 204 can be written to or read from, at any time, regardless of the locations of the head pointer 222 or the tail pointer 224. In some examples, the direct address map 240 can be implemented as a mapping, with an entry for each address in the instruction memory 204. In these examples, address zero in the mapping refers to address zero of the instruction memory 204, and the last address in the mapping (e.g., 0x03FF in the illustrated example) refers to the last address in the instruction memory 204. In some examples, the direct address map 240 can be implemented using a base address and a range, with the base address indicating the first address of the instruction memory 204 and the range indicating the number of addresses in the instruction memory 204.

In various examples, the indirect address map 242 enables indirect addressing of the instruction memory 204. In the indirect address map 242, address zero of the indirect address map 242 always maps to the address pointed to by the tail pointer 224. As illustrated in the example of FIG. 2, this may mean that addresses from the tail pointer 224 to the end of the instruction memory 204 are mapped to the start of the indirect address map 242 and addresses from the first address in the instruction memory 204 to the tail pointer 224 come after. Additionally, whenever the tail pointer 224 is moved, the mapping of indirect address zero changes correspondingly, along with all the addresses that follow. The indirect address map 242 can be represented by, for example, an address range (0x1000 to 0x13FF in the example of FIG. 2) that can be allocated for this purpose. In this example, software can write instructions starting at address 0x1000 to add the instructions to the instruction memory 204, and a translation circuit, for example in the data management processor, can translate address 0x1000 to the location pointed to by the tail pointer. Also in this example, once the instructions have been written to the instruction memory 204, software can increment the tail pointer by writing a value to a particular address, the value indicating the number of instructions to execute (which may be fewer than all of the instructions added to the instruction memory). In these and other examples, by using the indirect address map 242, software (e.g., a driver program) may not need to keep track of the tail pointer 224.

The indirect address map 242 can enable several optimizations for loading program code in the instruction memory 204. For example, when a DMA engine is used to load program code, software can configure a DMA descriptor that indicates an address in memory from which the DMA engine can read the program code, and can indicate indirect address 0x1000 (in the example of FIG. 2) as the location in the instruction memory 204 where the DMA engine can write the code. In this example, the same DMA descriptors can be used to load the same code multiple times, without either software or the DMA engine needing to know where the tail pointer is located at any time. Also in this example, once the DMA engine has finished writing the code, software can increment the tail pointer, or the DMA engine can generate a write transaction to increment the tail pointer. As another example, the software can configure DMA descriptors so that parts of one program can be sequentially loaded into the instruction memory 204, as may be needed when the program is too long to fit in the instruction memory 204 all at once, or when parts of the program are executed more than once. As another example, the software can configure a series of different programs to be loaded into the instruction memory 204. In each of these examples, software need not compute or track where in the instruction memory 204 to load additional code, and can instead rely on the first address of the indirect address map 242 mapping to the location of the tail pointer 224.

In various examples, the integrated circuit that manages the instruction memory 204 maintains the indirect address map 242. For example, when the management circuit receives a write transaction for the instruction memory 204 that is indicated as an indirect write (e.g. by the address used, by a flag in the transaction, or by some other indication), the management circuit can use the address of the write transaction as an offset from the tail pointer 224, and can write the data from the transaction at the address indicated by the offset. Alternatively, the management circuit can maintain a mapping of indirect addresses to direct addresses, which the management circuit updates whenever the tail pointer 224 is advanced.

In various examples, a memory such as is described in FIGS. 1 and 2 can be used for other purposes. For example, an integrated circuit can include a memory that the integrated circuit operates as a FIFO, that is directly addressable, and for which the integrated circuit maintains a tail pointer that is incremented by external write transactions received by the integrated circuit. In this example, the integrated circuit can use the memory to store data that is to be operated on by circuit blocks in the integrated circuit. In this and other examples, the data can represent integer numbers for arithmetic operations, floating point values for the floating point operations, packet data for network routing or switching operations, pixel data for video processing operations, and/or any other type of data for other types of operations.

Figure 3:
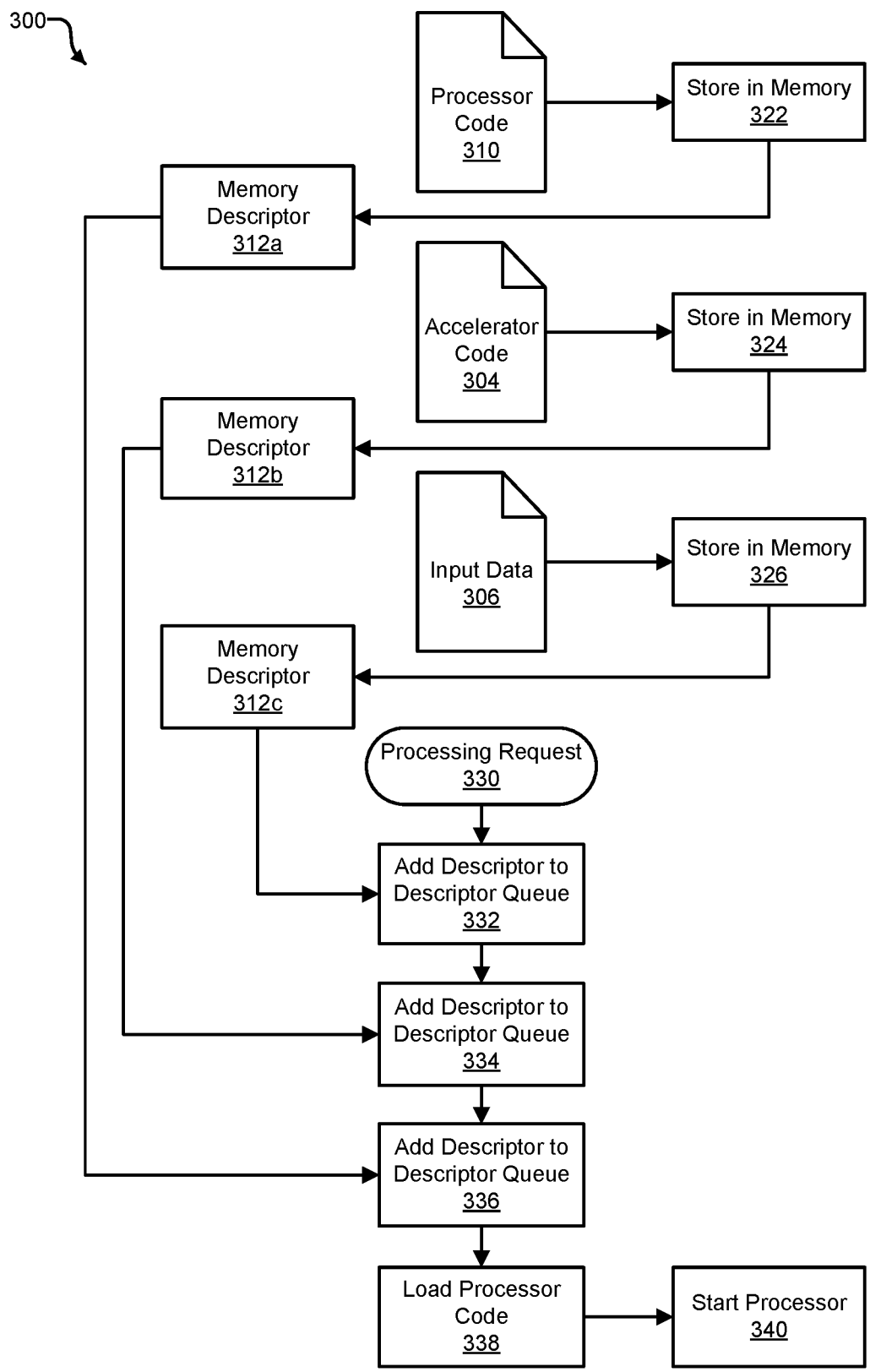
FIG. 3 includes a diagram illustrating an example process for programming a data management processor.

FIG. 3 includes a diagram illustrating an example process 300 for programming a data management processor, such as the processor illustrated in FIG. 1. The example process 300 of FIG. 3 can be executed by a device driver or driver program, either of which can be a software program executing on a general purpose processor. In some examples, the driver program can be specific to the data management processor. In some examples, the driver program can be a component of another piece of software, or the functionality of the driver program can be integrated into another driver or other software.

In various examples, tasks performed by the driver program can include managing processor code 310, accelerator code 304, and input data 306. The processor code 310 can be a program to be performed by the data management processor. The accelerator code 304 can be a program to be executed by an accelerator, such as a graphics accelerator, floating point accelerator, or neural networking accelerator. For example, the accelerator code 304 can include instructions and data that an accelerator applies to input data to compute a result. The input data 306 can include user input. For example, the input data 306 can include an input image to be rendered by a graphics accelerator, a set of values on which a floating point calculation is to be performed, or an input image on which a neural network will perform image recognition, among other examples.

In various examples, the process 300 includes, at step 322, storing the processor code 310 in memory. The driver program can obtain the processor code 310 from a hard drive or other storage location, or a network location, for example. The memory can be processor memory or a memory used by the accelerators. For example, the memory can be DRAM that is connected to an acceleration engine (e.g., an integrated circuit with one or more accelerators). In various examples, the memory used at step 322 is memory that is accessible to a DMA engine that is able to move data into and out of the memory.

When the driver program writes the processor code 310 to the memory, the driver program can store a first memory descriptor 312*a* for the processor code 310. The first memory descriptor 312*a* can describe, for example, the address in memory where the driver program has stored the processor code 310 and the length of the processor code 310 (e.g., in bytes, words, or some other denomination) to indicate an amount of data that needs to be read to obtain the processor code from the memory. In various examples, the driver program only needs to perform step 322 once for a particular program for the processor. In some examples, the driver program may divide the instructions for one program into smaller parts, for example so that the smaller parts can be individually loaded into the processor. In these examples, the driver program can perform step 322 once for each of the parts, and produce a different descriptor for each part.

At step 324, the process 300 further includes storing the accelerator code 304 in memory. The accelerator code 304 can be obtained from a storage location, a network location, or another location. The memory here can also be processor memory or memory used by the accelerators. In various examples, the memory used at step 324 is memory that is accessible to a DMA engine.

For the accelerator code 304, the driver program can store a second memory descriptor 312b. The second memory descriptor 312b can describe the address in memory where the accelerator code 304 can be found and the length of the accelerator code 304, and can be used to read the accelerator code 304 from the memory. In various examples, the driver program can perform step 322 once for the accelerator code 304. In some examples, the driver program performs step 322 only when particular accelerator code 304 is needed. In some examples, the driver program may divide the accelerator code 304 into smaller parts, perform step 322 for each part, and produce a different descriptor for each part. In various examples, the driver program can perform step 322 for any number of different programs for different accelerators, with each program being stored at a different address and thus having a different descriptor.

In various examples, the driver program stores the processor code 310 and/or the accelerator code 304 in advance of receiving any input data. That is, the processor code 310 and the accelerator code 304 are stored in anticipation of input data, and so that the both programs are ready when input data is received. Storing the processor code 310 and the accelerator code 304 in advance can save time in computing a result when input data is received. In other examples, the processor code 310 and accelerator code 304 are stored after input data is received, and an operation to be performed on the input data is determined.

The driver program can receive input data 306, for example, from an operating system that is also executing on the general purpose processor. The operating system may have received the input data 306 from a software program executing on top of the operating system, such as a video game, modeling software, a web browser, or another application. Alternatively, the operating system may have received the input data 306 over a network connection, with instructions for what needs to be performed on the input data 306. In some examples, the driver program may have received the input data 306 directly from a network.

When the input data 306 is received, at step 326, the driver program stores the input data 306 in memory. The input data 306 can be obtained, for example, from an input/output device, a storage location, or a network location, among other examples. The driver program can store the input data 306 in, for example, processor memory or a memory accessible to the accelerators. The driver program can further store a third memory descriptor 312c for the input data 306. The third memory descriptor 312c can describe where in memory the input data 306 is stored, and a size of the input data 306. In some examples, the driver program may divide the input data 306 into parts, store each part separately, and produce a memory descriptor for each part.

In various examples, at some point in time after the processor code 310, the accelerator code 304, and the input data 306 are stored, the driver program can receive, at step 330, a processing request. The processing request can be associated with the input data 306, such that the request indicates that the input data 306 should be operated on, and a computation to be performed on the input data 306. In various examples, the driver program can determine the accelerator code 304 needed to perform the computation. For example, when the input data 306 is an image and the processing operation is image recognition, the driver program can identify a program for the accelerator that can program the accelerator to perform the necessary computations.

In various examples, the driver program can also determine the processor code 310 that can program the data management processor to perform the data movement needed for the accelerator to be programmed and started, and for results computed by the accelerator to be provided back to the software program that requested the computation. In various examples, the processor code 310 can be used with different accelerator code 304, meaning that the accelerator code 304 does not need to be paired with specific processor code 310. In these and other examples, the processor code 310 can operate an accelerator without needing to know the code that the accelerator is executing. In some examples, there may be some dependency between the instructions in the processor code 310 and the accelerator code 304, such that the processor code 310 and the accelerator code 304 are loaded as a set.

Having determined the processor code 310 and/or the accelerator code 304 that will compute the desired result, at step 332, the driver program can add the third memory descriptor 312c, which is associated with the input data 306, to a descriptor queue. The descriptor queue can be, for example, a descriptor queue for a DMA engine. Descriptor queues can provide a mechanism for listing transactions to be performed by the DMA engine. Descriptor queues can also be called work queues, with each descriptor added to the queue describing a job to be performed by the DMA engine. In various examples, a number of descriptors can be added to a descriptor queue, and the DMA engine will wait to start processing descriptors until the DMA engine is informed of a quantity of descriptors to execute. Thus, for example, at step 332, the driver program can add a descriptor the queue, and the DMA engine may not immediately act on the descriptor.

In some examples, step 332 includes adding two descriptors to the descriptor queue, a first descriptor for reading the input data 306 from memory (e.g., a descriptor describing where the DMA engine should read the input data 306) and a second descriptor indicating where the DMA engine should write the input data 306 (e.g., into the memory of an accelerator). In some examples, the reading of the input data 306 from memory and writing the input data 306 into the accelerator can be handled with one descriptor.

At step 334, the driver program can add the second memory descriptor 312b, which is associated with the accelerator code 304, to a descriptor queue. In some examples, at step 334 the driver program adds two descriptors to the descriptor queue, one for reading the accelerator code 304 from memory and another for writing the accelerator code 304 to an accelerator. In some examples, the descriptor queue at step 334 is the same descriptor queue used at step 332, such that the same DMA engine will execute both the third memory descriptor 312c and the second memory descriptor 312b. In some examples, the second memory descriptor 312b is added to the descriptor queue of a different DMA engine than a DMA engine that will execute the third memory descriptor 312c, so that two DMA engines can act in parallel to move the input data 306 and the accelerator code 304 into the accelerator.

At step 336, the driver program can add the first memory descriptor 312a, which is for the processor code 310, to a descriptor queue. In some examples, at step 336, the driver program adds two descriptors to the descriptor queue, one to read the processor code 310 from memory and another to write the processor code 310 to a data management processor. In various examples, the driver program adds each of the three descriptors of this example to the same descriptor queue or two different descriptor queues, depending on whether the driver program intends for one DMA engine to execute all three descriptors or for different DMA engines to execute the three descriptors.

In the example of FIG. 3, the order of steps 332, 334, and 336 is provided merely as an example of the order in which the descriptors can be added to descriptor queues. The order is not necessarily significant, and in many cases the particular descriptors of this example can be added to descriptor queues in any order.

After the descriptors have been added to descriptor queues, at step 338, the process 300 includes loading the processor code. Specifically, the driver program can increment a pointer for the descriptor queue that contains the first memory descriptor 312a, so that the DMA engine is activated and executes the first memory descriptor 312a. Using descriptions for the location of the processor code 310 in memory, the length of the processor code 310, and a destination address in the data management processor's instruction memory, the DMA engine can move the processor code 310 from memory and into the data management processor.

As noted above, the step of loading the processor code can be simplified through use of an indirect address map for the data management processor's instruction memory. For example, the driver program can add the first memory descriptor 312a to a descriptor queue without knowing a current location of the data management processor's tail pointer. That is, the driver program need not take additional steps to determine a location in the data management processor's memory to which to write the processor code 310; instead, the driver program can use indirect address zero, and be guaranteed that the processor code 310 will be written starting at the tail pointer.

Once the processor code 310 is copied into the data management processor, at step 340, the data management processor can be started. In some examples, the driver program can start the data management processor by incrementing the instruction memory's tail pointer. In some examples, a DMA engine, such as the DMA engine that loads the processor code at step 336, can increment the tail pointer. For example, the DMA engine can include, in the DMA engine's descriptor queue, a write transaction that writes a value to the data management processor to move the tail pointer. In these and other examples, the tail pointer can be moved by at least one address and by as many as all the addresses occupied by the processor code 310. In some examples, the data management processor can be made to execute a few instructions, and then trigger the driver program to check on the status of the data management processor, an accelerator, or some other component or operation before allowing the data management processor to proceed with more instructions.

In some examples, the processor code 310 may be greater in size than the size of the data management processor's instruction memory. In these examples, the driver program may have multiple descriptors for the processor code 310, each of which describe a segment or part of the driver program. For example, a first descriptor can describe the first 128 KB of the driver program, and a second descriptor can describe the remaining 64 KB. In this example, all 192 KB of the program can be storied contiguously, or the two parts can be stored separately. In this and other examples, the descriptors for the processor code 310 can be added to either the same descriptor queue or different descriptor queues. The driver program can enable a DMA engine to load the first part of the processor code 310, and can trigger the processor to begin executing this first part of the processor code 310. The driver program can then wait until the processor has executed some or all of the first part of the processor code 310, and can then trigger the DMA engine to load another part of the processor code 310.

To determine that the processor's instruction memory can accept more code, the driver program can, for example, request information from data management processor. For example, the data management processor may provide an amount of free space in the instruction memory, and/or may provide the locations of the head pointer, the tail pointer, and/or the completion pointer.

In some examples, the processor code 310 can be written such that the data management processor can load additional code into itself. For example, an instruction in the processor code 310 can trigger a DMA engine to copy additional program code from memory and into the instruction memory of the data management processor. In this example, the data management processor can execute the additional program code upon receiving an update to the tail pointer from the driver program. Alternatively or additionally, the data management processor's instruction set can include an instructions for incrementing the tail pointer. This instruction can be included in the processor code 310, so that, when the instruction is executed by the data management processor, the tail pointer is advanced. In this example, the data management processor can self-load code and self-start, so that operations by the driver code may not be needed.

Figure 4:
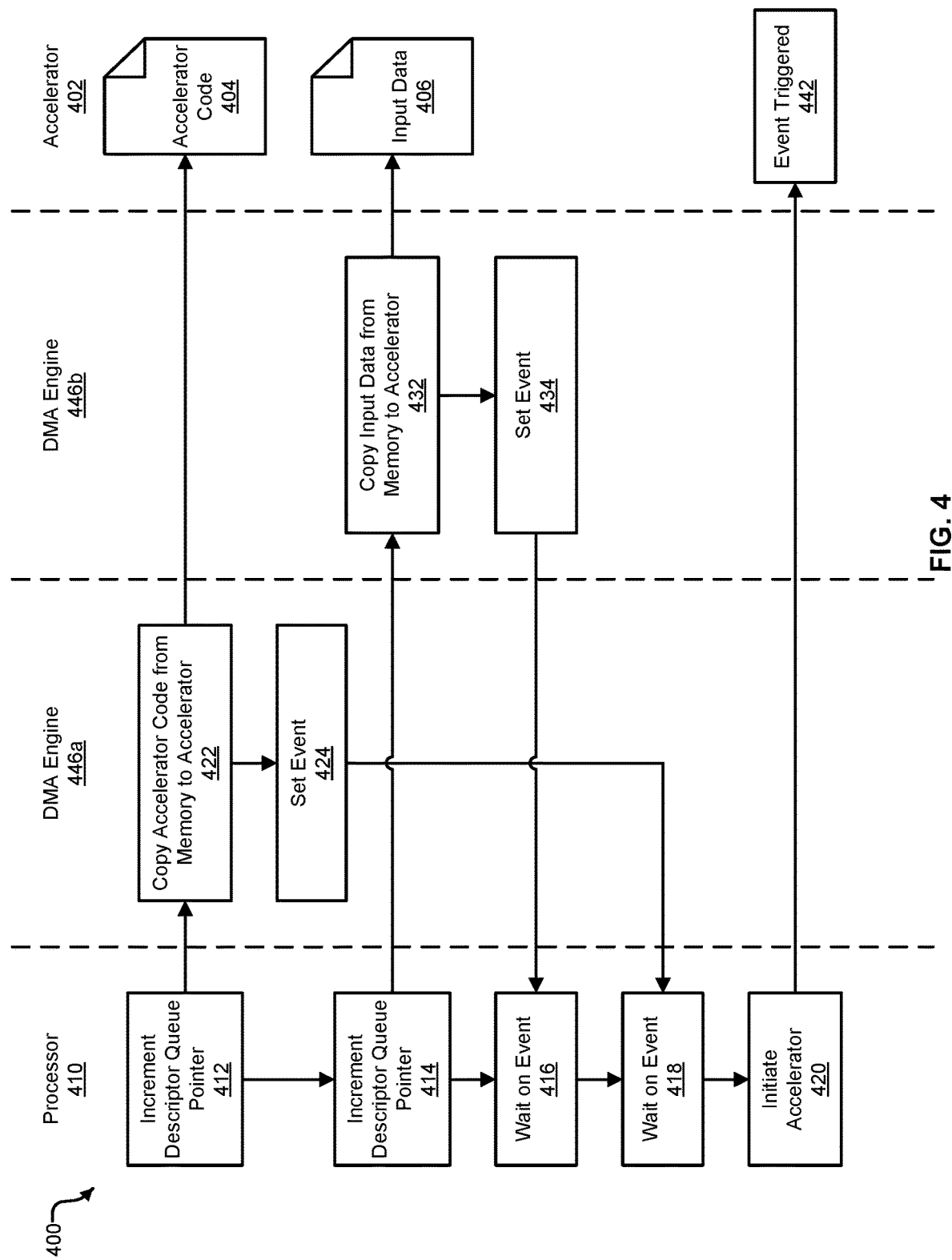
FIG. 4 includes a flowchart illustrating an example of program code for a data management processor.

FIG. 4 includes a flowchart illustrating an example of program code 400 for a data management processor 410, and the actions triggered when the data management processor executes the instructions in the program code. The program code 400 of this example sets up an accelerator 402 to perform a computation on a set of input data 406. The computation can be, for example, execution of a neural network, rendering of graphics, or floating point calculations, among other computations. As discussed above, the processor 410 can begin executing the program code when the processor 410 finds that a head pointer for the processor's instruction memory is not pointing to a same address as the address pointed to by the tail pointer.

Step 412 illustrates a first instruction, in which the processor 410 increments a descriptor queue pointer for a first DMA engine 446a. Descriptors may have been added to the first DMA engine's descriptor queue in advance, for example by a driver program, as discussed above. To increment the descriptor queue pointer, the processor 410 can, for example, write a command to the first DMA engine 446a that instructs the first DMA engine 446a to increment a pointer for the first DMA engine's descriptor queue by a certain number of entries. In various examples, the processor 410 does not wait for nor expect a reply to this command, and instead moves on to the next instruction.

In the meantime, the first DMA engine 446a will, at step 422, execute a descriptor in the descriptor queue of the first DMA engine 446a. In this example, executing the descriptor causes the first DMA engine 446a to copy the accelerator code 404 from a memory location where the accelerator code 404 is stored to memory location in the accelerator 402. In various examples, the accelerator code 404 provides instructions, and possibly also data, that the accelerator 402 can use to perform a computation or a series of computations. In some examples, the copy operation of step 422 can involve two memory descriptors, a first that informs the first DMA engine 446a where to read the accelerator code 404 and a second that informs the first DMA engine 446a where to write the accelerator code 404. In these examples, the instruction at step 412 can include incrementing the descriptor queue pointer by two entries. The increment value the first DMA engine 446a receives from the instruction at step 412 can act as a counter, and the first DMA engine 446a can execute a descriptor for each count until the number of descriptors executed equals the count.

In various examples, the descriptor queue of the first DMA engine 446a can also include, at step 424, a descriptor that causes the first DMA engine 446a to set an event register in the processor 410. In various examples, step 424 is not executed until the copying of the accelerator code 404 at step 422 completes. Setting the event, at step 424, thus can inform the processor 410 that copying of the accelerator code 404 has completed. An event can be represented in the processor 410 by a register or memory address to which other components, such as DMA engines and accelerators, can write. At step 424, for example, the first DMA engine 446a can execute a descriptor that includes a write to the register or memory location of a particular event. Events are discussed further below.

At step 414, the processor 410 executes a second instruction, which causes the processor 410 to increment the descriptor queue pointer for a second DMA engine 446b. To increment the descriptor queue pointer for the second DMA engine 446b, the processor 410 can, for example, send a command to the second DMA engine 446b that instructs the second DMA engine 446b to increment a descriptor queue pointer by a certain number of entries. In various examples, the processor 410 does not expect or wait for a response to this command, and instead proceeds to the next instruction.

At step 432, having been instructed to execute a number of descriptors, the second DMA engine 446b can sequentially execute the descriptors. In the example of FIG. 4, the descriptors cause the second DMA engine 446b to copy input data 406 from a memory location where the input data 406 is stored to memory in the accelerator 402. The input data 406 can be data on which the accelerator 402 performs the computation programmed by the accelerator code 404, and for which a result is desired. In some examples, copying the input data 406 involves two descriptors, one descriptor that causes the second DMA engine 446b to read the input data 406 from the storage location and a second that causes the second DMA engine 446b to write the input data 406 to the accelerator 402.

In various examples, after executing the copy operation at step 432, the second DMA engine 446b, at step 434, sets an event in the processor 410. Setting the event can include, for example, transmitting a write transaction, with a particular address, to the processor 410. In various examples, the second DMA engine 446b executes step 434 only after the copy operation of step 432 completes, so that the event informs the processor 410 that copying of the input data 406 has finished. In some examples, the write transaction can be initiated by a descriptor in the descriptor queue of the second DMA engine 446b that the processor 410 instructs the second DMA engine 446b to execute.

As noted above, the processor 410 can execute the instructions at steps 412 and 414 without waiting for a reply or acknowledgment from either the first DMA engine 446a or the second DMA engine 446b. The processor 410 can thus proceed to step 416, at which the processor 410 decodes and executes an instruction to wait for an event. Waiting on an event can include, for example, monitoring a particular register or memory location for a write to the register or memory location. In some examples, the processor 410 can have a number of registers or address locations that each represent a different event. In these examples, each register or memory location can represent a different event. In some examples, for an event to occur, a particular value must be written to the register or memory location. The value can represent, for example, an identity of the event that is being set. Alternatively or additionally, a value of "1" can indicate that the event has been set, while a value of "0" indicates that the event has not been set. Alternatively or additionally, in some examples, any value can be written to the register or memory location to indicate that the event has occurred.

In the example of FIG. 4, the processor 410 waits, at step 416, for a first event to occur. In this example, the first event is set by the second DMA engine 446b, and setting of the event by second DMA engine 446b may occur some time after the processor 410 reaches the instruction at step 416. The processor 410 may thus wait and execute no further instructions until receiving an indication that the first event is being set. Upon receiving this indication, the processor 410 can proceed to step 418.

At step 418, the processor 410 decodes and executes an instruction to wait on a second event. In various examples, the processor 410 can distinguish the second event from the first event from an identifier associated with the events, an address for each event, or some other encoding for the events. In the example of FIG. 4, the second event is set by the first DMA engine 446a. Setting of the second event by the first DMA engine 446a may have occurred before setting of the first event by the second DMA engine 446b. For example, the first DMA engine 446a may have had a smaller amount of data to move than did the second DMA engine 446b. In this and other examples, when the processor 410 encounters the instruction to wait on the second event, the processor 410 may find the event already set, and may thus proceed to the next instruction.

The order in FIG. 4 of steps 416 and 418 is provided as an example. In other examples, these steps can be reversed, with the same outcome (e.g., the processor 410 waits for the copy operations of both step 422 and step 432 to complete before proceeding) occurring.

At step 420, the processor 410 may next decode and execute an instruction to initiate the accelerator 402. This instruction can, for example, cause the processor 410 to send a write transaction to the accelerator 402, which sets an event at the accelerator 402. Events at the accelerator 402 can operate in a similar fashion as events in the processor 410, in that the accelerator 402 may be able to watch particular registers or memory addresses for values to be written to these registers or memory locations. In the example of FIG. 4, the accelerator 402 can thus, at step 442, see that an activation event has been triggered, which can cause the accelerator 402 to begin executing the accelerator code 404.

In various examples, the program code 400 can include additional steps that are similar to the steps illustrated in FIG. 4. For example, the accelerator code 404 may include stages, such that the program code 400 includes instructions to successively load each stage into the accelerator 402.

These instructions can take the form of additional instructions to increment descriptor queues.

In various examples, the program code 400 can also include instructions for copying a result computed by the accelerator 402 to a memory location, such as in the host memory. In these examples, the program code 400 can include instructions to increment additional descriptor queue pointers, which cause a DMA engine to read data from the accelerator 402 and write the data into a memory location.

In the example of FIG. 4, the program code 400 makes use of two DMA engines and one accelerator. In other examples, program code can make use of one DMA engine and one accelerator, one DMA engine and multiple accelerators, or multiple DMA engines and multiple accelerators. In each of these cases, the number and identity of the DMA engines and the accelerators is encoded in the instructions of the program code.

FIG. 5 is a flowchart that illustrates an example of a process 500 for operating an integrated circuit. The process 500 may be implemented by an integrated circuit device, such as for example the data management processor illustrated in FIG. 1.

At step 502, the process 500 of FIG. 5 includes receiving a write transaction for writing a set of data to a memory of the integrated circuit, wherein the integrated circuit includes a head pointer and a tail pointer, the head pointer and the tail pointer each referring to addresses in the memory, and wherein the memory is directly addressable. In some examples, the set of data is a set of instructions comprising program code to be executed by the integrated circuit. In some examples, the head pointer and the tail pointer enable the integrated circuit to use the memory as a first-in, first-out (FIFO) memory. For example, the head pointer can refer to (e.g., point to) a first address in the memory, where the first address can store the next data to be read from the memory, and the tail pointer can refer to a second address, where the second address can store the last data to read from the memory. In this example, when the head pointer and the tail pointer refer to different addresses, then each can be referring to addresses that have data for reading. When the head pointer and the tail pointer refer to the same address, then the data stored at the address may have already been read. Additionally, when the head pointer and the tail pointer refer to the same address, the integrated circuit can determine to stop reading the memory.

The tail pointer can further indicate an address at which new data can be written. For example, the process 500 can include receiving a write transaction including new data. The process 500 can further include writing the new data at the address referred to by the tail pointer. In this and other examples, the integrated circuit does not modify the tail pointer upon completion of writing the new data.

In various examples, the tail pointer is modified when the integrated circuit receives a write transaction including a number. In these examples, the integrated circuit can use the number to modify the tail pointer, by incrementing the tail pointer by a number of addresses equaling the number. In some examples, the write transaction is initiated by a host processor. In some examples, the write transaction is initiated by a DMA engine.

In various examples, the integrated circuit can include a first register for storing the head pointer and a second register for storing the tail pointer.

In various examples, a pointer equaling one of the head pointer or the tail pointer is set to zero when incrementing the pointer results in the pointer referring to a last address of the memory plus one. That is, when incrementing a pointer (either the header pointer or the tail pointer) would result in the pointer referring to an address that is greater than the range of addresses in the memory, the pointer is instead set to point at address zero and incremented from there. In some examples, when incrementing either the head pointer or the tail pointer results in the pointer referring to an address that is greater than a last address of the memory (e.g., an out-of-range address), the pointer is set to zero plus a difference between the out-of-range address and the last address of the memory.

At step 504, the process 500 includes sequentially writing the set of data to the memory, wherein a first data from the set of data is written to a first address of the memory, wherein the tail pointer is not modified as a result of writing the set of data. In various examples, writing of the set of data to the memory is enabled by the memory being directly addressable. That is, the write transaction can include an address from among any of the addresses of the memory, and need not be restricted to an address that corresponds to the current location of the tail pointer.

By being directly addressable, each address in the memory can be written to by a write transaction that specifies the address. Thus, for example, the first address can be an address included with the write transaction.

In some examples, the memory is also indirectly addressable. By being indirectly addressable, each address can be written to by a write transaction that specifies an address that is offset from a particular address. The particular address can be an address pointed to by the tail pointer, such that a write to an offset from the particular address will be translated by the integrated circuit to a write to an address at an equivalent offset from the present tail pointer location. For example, the integrated circuit can include an address map that includes an entry for each address in the memory. In this example, a zeroth entry in the address map always corresponds to the location of the tail pointer, so that a write to an address within the range of the address map is treated by the integrated circuit as a write relative to the current tail pointer location. Thus, though the tail pointer's location may change, the same addresses from the address map can be used to add data to the memory in locations after the tail pointer.

In various examples, the process 500 can thus include determining that the write transaction includes an indirect address, and using the indirect address to determine the first address. Here, the first address is at an offset from an address referred to by the tail pointer, the offset being indicated by the indirect address. In some examples, the write transaction can include an indicator indicating that an address included with the write transaction is an indirect address. The indicator can be, for example, a particular address used, an address range within which the particular address can be found, a flag in the transaction, or another piece of information that can be part of the write transaction.

At step 506, the process 500 includes receiving a transaction for updating the tail pointer, the transaction including a value. The transaction can be, for example, a write transaction address to an address designated for receiving updates for the tail pointer.

At step 508, the process 500 includes incrementing the tail pointer by a number of addresses equaling the value, wherein, after being incremented, the tail pointer refers to a second address.

At step 510, the process 500 includes determining that a head pointer is referring to an address other than the second address. For example, before the tail pointer was incremented at step 508, the head pointer and the tail pointer may have been referring to the same address, and after the tail pointer is incremented, each pointer is referred to different addresses. In various examples, the integrated circuit can include an fetch circuit that makes the determination that the head pointer and the tail pointer are referring to different addresses.

At step 512, the process 500 includes initiating a read of data at the address referred to by the head pointer. In various examples, the fetch circuit can perform the reading of the instruction, and/or can cause the data to be read and provided to an execution circuit (e.g., by setting the memory input signals to read the data, with the read data being output to the execution circuit).

In some examples, the process 500 can include performing an operation on the data read as a result of step 512. In various examples, the integrated circuit includes an execution unit that can perform an operation on the data. In some examples, when the data is a program instruction, the execution unit decodes the instruction before executing the instruction, to determine operations to be execute. An instruction stored in the memory can include, for example, a command to a DMA engine to increment the DMA engine's descriptor queue pointers, which can cause the DMA engine to execute one or more descriptors. In these examples, execution of the descriptors can cause the DMA engine to move data from a first location to a second location. As another example, an instruction stored in the memory can cause a DMA engine to move additional instructions into the memory.

In some examples, the integrated circuit can include a completion pointer that refers to an address in the memory. The integrated circuit can, for example, have a register that stores the completion pointer. In these and other examples, the address referred to by the completion pointer can include the last data that the integrated circuit has finished operating upon.

In some examples, the process 500 can further include pre-fetching a set of data from the memory. In these examples, pre-fetching can include initiating reads of the memory for each of the set of data. An execution circuit of the integrated can store the set of data. As a further example, whenever the execution circuit completes an operation on the data, the execution circuit can send an indication to the fetch circuit. When the fetch circuit is maintaining a completion pointer, the indication can cause the instruction fetch circuit to increment the completion pointer by one address.

At step 514, the process 500 includes incrementing the head pointer to refer to a next address. When this next address is not also referred to by the tail pointer, then the process 500 can further include initiating another read of the memory to fetch another instruction. When the tail pointer also refers to the next address, then the integrated circuit can stop initiating reads of the memory.

Figure 6:
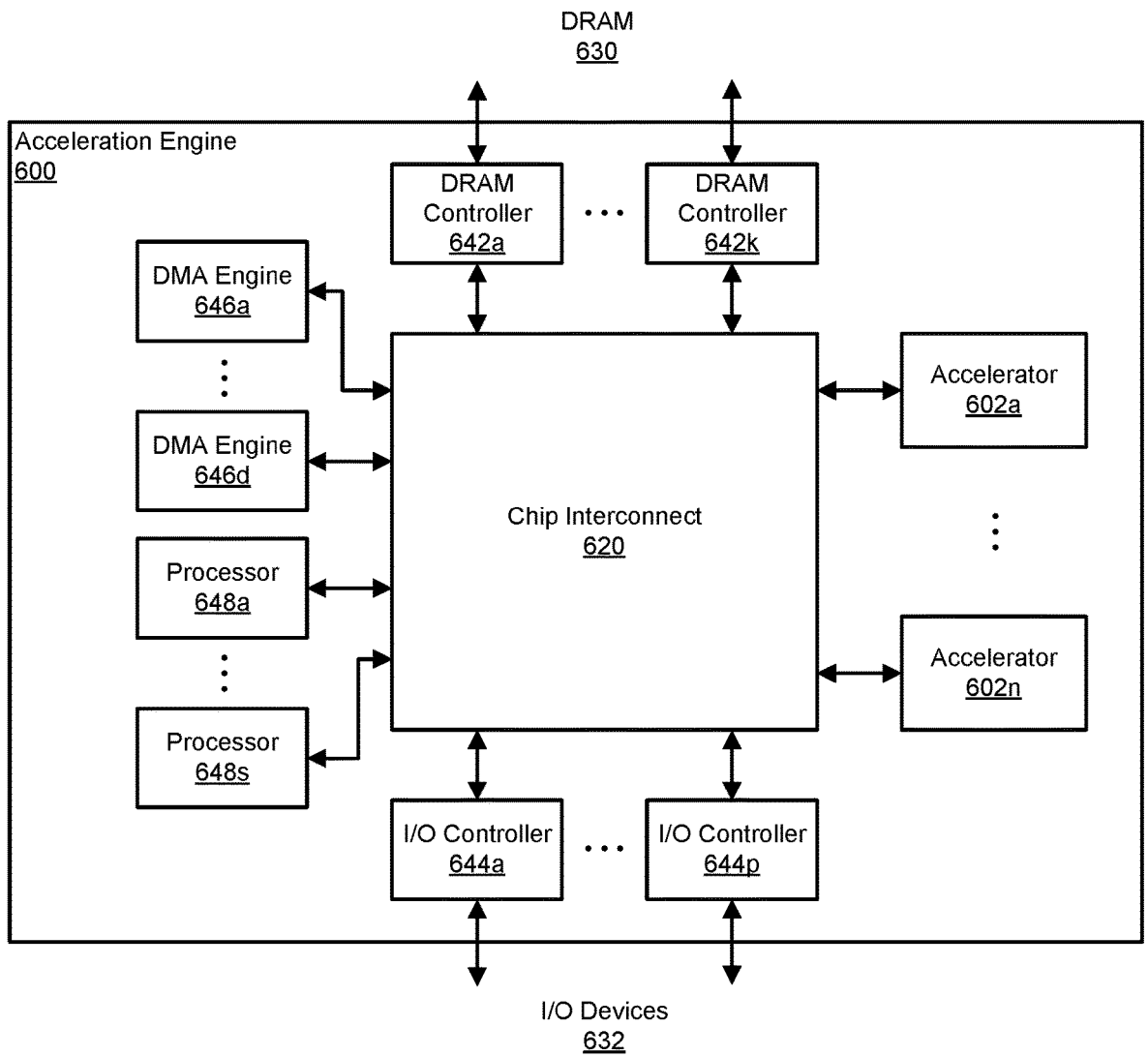
FIG. 6 includes a block diagram that illustrates an example of an acceleration engine.

FIG. 6 includes a block diagram that illustrates an example of an acceleration engine 600. The acceleration engine 600 is an example of an integrated circuit where data may frequently be moving into and out of the acceleration engine 600. This movement of data can be managed by one or more data management processors 648*a*-648*s*, such as are discussed above. In the example of FIG. 6, the acceleration engine includes s processors 648*a*-648*s* incorporated into (e.g., on the same silicon die) the device. In other examples, the processors 648*a*-648*s* can be external to the acceleration engine 600 (e.g., on a different die and/or in a different package).

In the example of FIG. 6, the acceleration engine 600 includes multiple accelerators 602*a*-602*n*, each of which can perform a set of operations. In various examples, the accelerators 602*a*-602*n* for particular types of operations, so that the accelerators 602*a*-602*n* can perform the operations much faster than when similar operations are performed by a general purpose processor. In various examples, to perform a set of operations, input data on which the operations are to be performed must first be moved into the accelerators 602*a*-602*n*. Additionally, in some cases, program code is also moved into the accelerators 602*a*-602*n*, which programs the operations that the accelerators 602*a*-602*n* will perform on the data. In the illustrated example, the acceleration engine 600 includes n accelerators 602*a*-602*n*. Examples of accelerators that can be included in the acceleration engine 600 include graphics accelerators, floating point accelerators, neural network accelerators, and others. In various examples, the accelerators 602*a*-602*n* can each be the same (e.g., each of the accelerators is a graphics accelerator) or can be different (e.g., the accelerators 602*a*-602*n* include a graphics accelerator, a floating point accelerator, and neural network accelerator).

The example acceleration engine 600 further includes DRAM controllers 642*a*-642*k* for communicating with an external memory. The external memory is implemented, in this example, using DRAM 630. In the illustrated example, the acceleration engine 600 includes k DRAM controllers 642*a*-642*k*, each of which may be able to communicate with an independent set of banks of DRAM. In other examples, other types of RAM technology can be used for the external memory. The DRAM controllers 642*a*-642*k* can also be referred to as memory controllers.

In various examples, input data and/or program code for the accelerators 602*a*-602*n* can be stored in the DRAM 630. Different programs can cause the accelerators 602*a*-602*n* to perform different operations. For example, when one of the accelerators is a neural network accelerator, one program can configure the neural network accelerator to perform speech recognition while another program can configure the neural network accelerator to perform image recognition. In various examples, different accelerators 602*a*-602*n* can be programmed with different programs, so that each performs a different set of operations. In various examples, the processors 648*a*-648*s* can manage moving of program code from the DRAM 630 to the accelerators 602*a*-602*n*.

The example acceleration engine 600 further includes I/O controllers 644*a*-644*p* for communicating with I/O devices 632 in the system. The acceleration engine 600 can communicate with I/O devices over, for example, a processor bus. In some examples, the processor bus can be implemented using Peripheral Component Interconnect (PCI) and/or a variation of the PCI bus protocol. The processor bus can connect the acceleration engine 600 to I/O devices such as, for example, input and output devices, memory controllers, storage devices, and/or network interface cards, among other things. In some examples, the I/O controllers 644-644*p* can enable the acceleration engine 600 to act as an I/O device for a host processor. For example, the acceleration engine 600 can be the recipient of input data from the host processor, and a command indicating an operation to be performed on the input data (e.g., a particular computation or analysis). In the illustrated example, the acceleration engine 600 includes p I/O controllers 644*a*-644*p*, each of which may include a separate root complex and may communicate with a separate set of I/O devices 632. In other examples, other standardized bus protocols, such as Ultra Path Interconnect (UPI) can be used for the host bus. In other examples, a proprietary bus protocol can be used.

In some examples, the processors 648a-648s can manage the movement of data from I/O devices 632 to the accelerators 602a-602n or the DRAM 630. For example, input data may be located at an I/O device 632 or in processor memory, and the processors 648a-648s can move the input from the I/O device 632 or processor memory into an accelerator or into DRAM 630. As another example, program code for the accelerators 602a-602n may be located on an I/O device 632 or in processor memory.

The example acceleration engine 600 further includes DMA engines 646a-646d that can move data between the accelerators 602a-602n, DRAM controllers 642a-642k, and I/O controllers 644a-644p. In the illustrated example, the acceleration engine 600 includes d DMA engines 646a-646d. In some implementations, the DMA engines 646a-646d can be assigned to specific tasks, such as moving data from the DRAM controllers 642a-642d to the accelerators 602a-602n, or moving data between the I/O controllers 644a-644p and the accelerators 602a-602n. These tasks can be assigned, for example, by enqueueing descriptors with the DMA engines 646a-646d, where a descriptor identifies an address for a block of data and an operation (e.g., a read or a write) to perform. A descriptor, for example, can direct a DMA engine to instruct a DMA controller to read a block of data from DRAM 630. A descriptor can, as a further example, instruct the DMA engine to write data, read by the DMA controller, to an accelerator. Further descriptors can be used to move data from an accelerator to DRAM 630.

In various examples, each of the processors 648a-648s can be responsible for managing the data movement for a different accelerator. In some examples, a processor may manage the data movement for more than one accelerator. Similarly, in various examples, each of the processors 648a-648s can be assigned to one or more DMA engines 646a-646d. In these and other examples, associations between processors 648a-648s, accelerators 602a-602n, and DMA engines 646a-646d is determined by program code being executed by each respective processor.

In the example acceleration engine 600, the various components can communicate over a chip interconnect 620. The chip interconnect 620 primarily includes wiring for routing data between the components of the acceleration engine 600. In some cases, the chip interconnect 620 can include a minimal amount of logic, such as multiplexors to control the direction of data, flip-flops for handling clock domain crossings, and timing logic.

Figure 7:
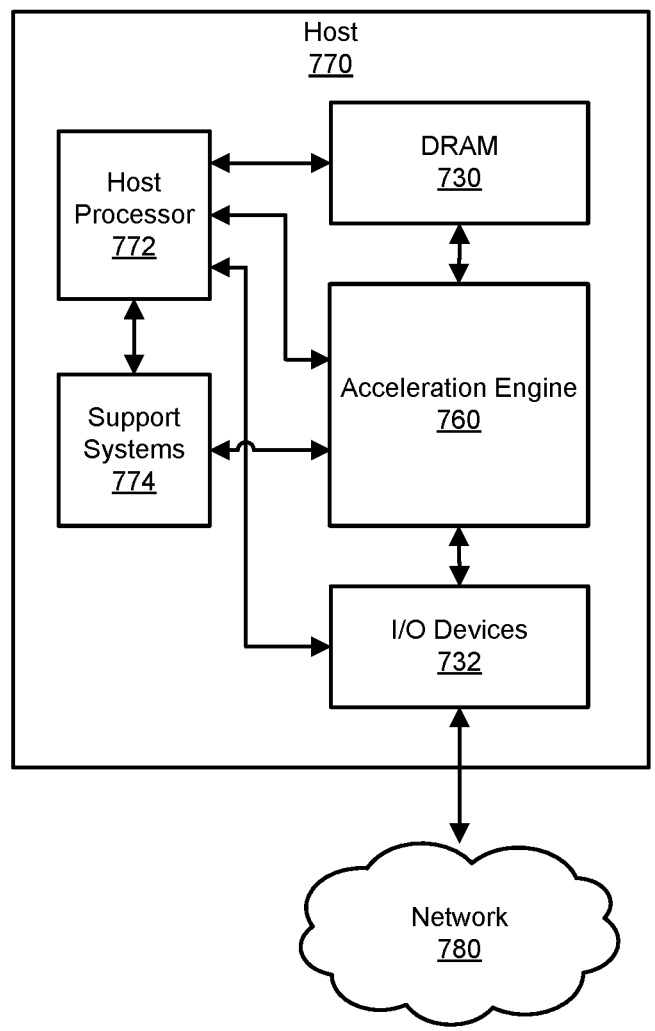
FIG. 7 includes a block diagram that illustrates an example of a host system.

FIG. 7 includes a block diagram that illustrates an example of a host system 770 in which an acceleration engine 760 can be used. The example host system 770 includes the acceleration engine 760, a host processor 772, DRAM 730 or processor memory, I/O devices 732, and support systems 774. In various implementations, the host system 770 can include other hardware that is not illustrated here.

The host processor 772 is a general purpose integrated circuit that is capable of executing program instructions. In some examples, the host processor 772 can include multiple processing cores. In some examples, the host system 770 can include more than one host processor 772. In some examples, the host processor 772 and the acceleration engine 760 can be one chip, such as, for example, one or more integrated circuits within the same package.

The DRAM 730 can include memory that is used by the host processor 772 for storage of program code that the host processor 772 is in the process of executing, as well as for storage of values that are being operated on by the host processor 772. In some examples, the DRAM 730 is also accessible to the acceleration engine 760. In some examples, the DRAM 730 includes separate memory or memory banks for processor memory and for use by the acceleration engine 760. That is, the DRAM 730 can be at least two physically separate memories, with one memory being accessible to the host processor 772 and not directly accessible to the acceleration engine 1060, and the other memory being accessible to the acceleration engine and not directly accessible to the host processor 772. DRAM is a common term for small, fast memory used for processor memory, and though DRAM is volatile memory, in various examples volatile and/or non-volatile memory can be used.

The I/O devices 732 can include hardware for connecting to user input and output devices, such as keyboards, monitors, and printers, among other devices The I/O devices 732 can also include storage drives and/or a network interface for connecting to a network 780.

In various implementations, the support systems 774 can include hardware for coordinating the operations of the acceleration engine 760. For example, the support systems 774 can include one or more data management processors, which can management the movement of data into and out of on the acceleration engine 760. In some examples, the data management processors and the acceleration engine 760 can be on one chip, such as one integrated circuit on the same die and in the same package.

In various examples, software programs executing on the host processor 772 can receive or generate input for processing by the acceleration engine 760. The programs can include, for example, graphics intensive programs such as video games or computer-aided design programs, computationally intensive programs such as modeling programs, or artificial intelligence programs such as speech recognition or image recognition programs. In various examples, the host processor 772 can determine to offload operations on input received from such programs to the acceleration engine 760, which can perform the operations more quickly than the host processor 772.

To assist the host processor 772 in using the acceleration engine 760, the host processor can be executing a device driver or driver program for the acceleration engine 760. Similar to any other hardware driver, the driver program for the acceleration engine 760 can provide an interface through which an operating system can send requests to the acceleration engine 760 and receive results. Upon receiving a request, which can include data and an operation to be performed on the data, the driver program can handle execution of the operation by the acceleration engine 760, leaving the operating system free to perform other operations.

In various examples, handling a request for the acceleration engine 760 can including programming and activating a data management processor, which may be a component in the support systems 774 or in the acceleration engine 760. Programming the data management processor can include, for example, triggering a DMA transaction to copy program code from the DRAM 730 into the data management processor, and triggering the data management processor to execute the code. The copying and the triggering can be performed, for example, by the driver program. Alternatively, the copying and the triggering can be performed by way of DMA transactions. Once the data management processor begins executing code, the driver program need not take further action until the operation being performed by the accelerator engine 760 is finished.

In various examples, the code executed by the data management processor can configure the acceleration engine 760, including copying program code and input data into the accelerator engine 760 and triggering the accelerator engine 760 to being execution of the code. The data management processor can wait on the acceleration engine 760 to finish perform the operation, and can then copy any result of the operation from the acceleration engine 760 and into DRAM 730, for example, the data management processor can then inform the driver program that results are ready, which can then inform the operating system or the program for which the result was computed.

In some examples, the operations of the support systems 774 can be handled by the host processor 772. In these examples, the support systems 774 may not be needed and can be omitted from the host system 770.

Figure 8:
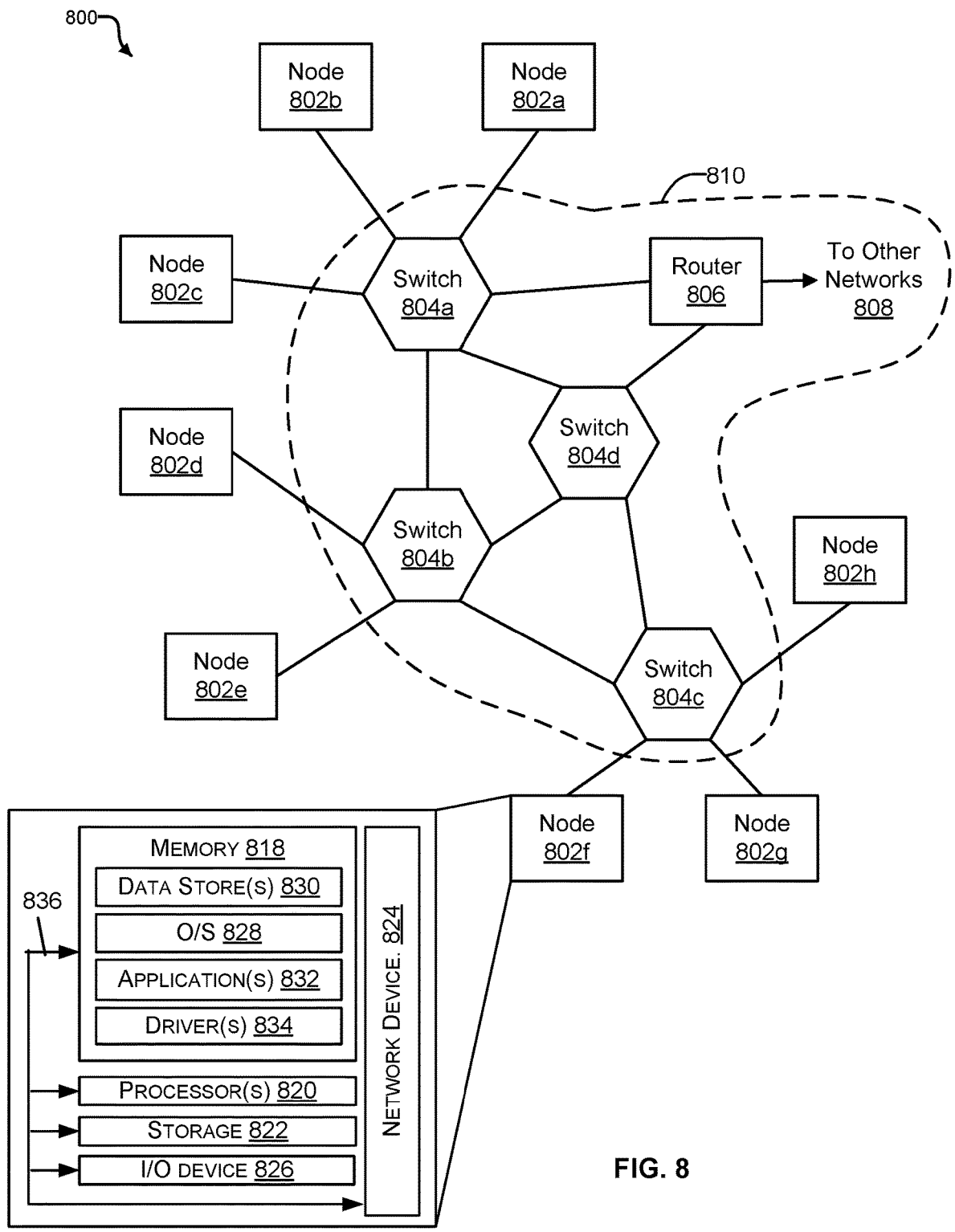
FIG. 8 illustrates an example architecture for features and systems described herein that includes one or more service provider computers and/or a user device connected via one or more networks, according to certain aspects of the disclosure.

FIG. 8 includes a diagram of an example network 800, which can include one or more host systems, such as the host system illustrated in FIG. 7. For example, the example network 800 of FIG. 8 includes multiple nodes 802a-802h, one or more of which can be a host system such as is illustrated in FIG. 7. Others of the nodes 802a-802h can be other computing devices, each of which include at least a memory for storing program instructions, a processor for executing the instructions, and a network interface for connecting to the network 800.

In various examples, the network 800 can be used to process data. For example, input data can be received at one of the nodes 802a-802h or from other networks 808 with which the network 800 can communicate. In this example, the input data can be directed to a node in the network 800 that includes an acceleration engine, for the acceleration engine to operate on and produce a result. The result can then be transferred to the node or other network from which the input data was received. In various examples, input data can be accumulated from various sources, including one or more of the nodes 802a-802h and/or computing devices located in the other networks 808, and the accumulated input data can be directed to one or more host systems in the network 800. Results from the host systems can then be distributed back to the sources from which the input data was gathered.

In various examples, one or more of the nodes 802a-802h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 8, the nodes 802a-802h are connected to one another using a switched architecture with point-to point links. The switched architecture includes multiple switches 804a-804d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 804a-804d of FIG. 8 may be connected to the nodes 802a-802h and provide multiple paths between any two nodes.

The network 800 may also include one or more network devices for connection with other networks 808, such as a router 806. Routers use headers and forwarding tables to determine the best path for forwarding the packets, and use protocols such as internet control message protocol (ICMP) to communicate with each other and configure the best route between any two devices. The router 806 of FIG. 8 can be used to connect to other networks 808 such as subnets, LANs, wide area networks (WANs), and/or the Internet.

In some examples, network 800 may include any one or a combination of many different types of networks, such as cable networks, the Internet, wireless networks, cellular networks and other private and/or public networks. The interconnected switches 804a-804d and the router 806, if present, may be referred to as a switch fabric 810, a fabric, a network fabric, or simply a network. In the context of a computer network, terms "fabric" and "network" may be used interchangeably herein.

The nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s)) 820. The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit for executing program instructions, comprising:
   a memory, wherein each address in the memory is directly addressable, and wherein each address can be written to by a write transaction that specifies the address;
   a first register operable to store a head pointer referring to a first address in the memory, wherein the first address can store a next instruction to read from the memory;
   a second register operable to store a tail pointer referring to a second address in the memory, wherein the second address can store a last instruction to read from the memory, and wherein the tail pointer indicates an address at which new instructions can be written, and wherein the tail pointer is not modified when new data is written to the memory;
   an execution circuit operable to perform operations on data read from the memory; and
   a fetch circuit, operable to:
      determine that the head pointer is referring to a different address than an address referred to by the tail pointer;
      initiate a read of the memory, wherein the read causes data at the address referred to by the head pointer to be provided to the execution circuit to be operated upon;
      increment the head pointer to refer at a third address, wherein the third address is one address after the first address; and
      determine, after incrementing the head pointer, whether the head pointer and the tail pointer are referring to a same address, wherein, when the head pointer and the tail pointer are referring to different addresses, the fetch circuit initiates another read of the memory, and wherein, when the head pointer and the tail pointer are referring to the same address, the fetch circuit stops initiating reads of the memory.

2. The integrated circuit of claim 1, wherein the memory is indirectly addressable such that each address can be written to by a write transaction that specifies an address that is offset from a particular address, wherein the particular address corresponds to an address pointed to by the tail pointer.

3. The integrated circuit of claim 1, wherein the tail pointer is modified when the integrated circuit receives a transaction to increment the tail pointer, the transaction including a number of addresses by which to increment the tail pointer.

4. An integrated circuit, comprising:
   a memory, wherein the integrated circuit operates the memory as a first-in, first-out buffer, and wherein each address in the memory is directly addressable;
   a first register operable to store a head pointer that refers to a first address in the memory;
   a second register operable to store a tail pointer that refers to a second address in the memory, wherein the tail pointer is not modified when new data is written to the memory;
   a fetch circuit, operable to:
      determine that the first address is different from the second address;
      initiate a read of data at the first address;
      increment the head pointer to point to a next address; and
      determine that the next address is a same address as the second address, wherein, based on the head pointer pointing to a same address as the tail pointer, the fetch circuit stops initiating reads of the memory.

5. The integrated circuit of claim 4, wherein the integrated circuit is operable to:
   receive a write transaction including the new data; and
   write the new data at the second address, wherein the tail pointer is not modified upon completion of writing the new data at the second address.

6. The integrated circuit of claim 4, wherein the integrated circuit is operable to:
   receive a write transaction including a number; and increment the tail pointer by a number of addresses equaling the number.

7. The integrated circuit of claim 6, wherein the write transaction is initiated by a host processor.

8. The integrated circuit of claim 6, wherein the write transaction is initiated by a Direct Memory Access (DMA) engine.

9. The integrated circuit of claim 4, wherein the integrated circuit is operable to:
   receive a write transaction that includes an address from among addresses of the memory; and write data included in the write transaction to a memory location indicated by the address.

10. The integrated circuit of claim 4, wherein the integrated circuit is operable to:
    receive a write transaction including an address and new data, wherein the write transaction includes an indicator indicating that the address is an indirect address;
    determine a corresponding address in the memory for the address included in the write transaction, wherein the corresponding address is determined by using the address included in the write transaction as an offset from the tail pointer; and
    write the new data to the corresponding address.

11. The integrated circuit of claim 10, wherein the indicator is an address range within which the address is located.

12. The integrated circuit of claim 10, wherein data stored in the memory includes program instructions, and further comprising:
    an execution circuit operable to execute instructions read from the memory by operations of the fetch circuit.

13. The integrated circuit of claim 12, wherein the head pointer refers to an address of a next instruction to execute, and wherein the tail pointer refers to an address of a last instruction to execute.

14. The integrated circuit of claim 12, further comprising:
    a third register operable to store a completion pointer that refers to a third address in the memory, wherein the third address includes a last instruction the execution circuit has finished executing.

15. A method implemented using an integrated circuit, comprising:
    receiving a write transaction for writing a set of data to a memory of the integrated circuit, wherein the integrated circuit stores a head pointer and a tail pointer, the head pointer and the tail pointer each referring to addresses in the memory, and wherein the memory is directly addressable;
    sequentially writing the set of data to the memory, wherein a first data from the set of data is written to a first address of the memory, wherein the tail pointer is not modified as a result of writing the set of data;
    receiving a transaction for updating the tail pointer, the transaction including a value;

incrementing the tail pointer by a number of addresses equaling the value, wherein, after being incremented, the tail pointer refers to a second address;
determining that the head pointer is referring to an address other than the second address;
initiating a read of data at the address referred to by the head pointer; and
incrementing the head pointer to refer to a next address.

16. The method of claim 15, wherein the head pointer and the tail pointer enable the integrated circuit to use the memory as a first-in, first-out (FIFO) memory.

17. The method of claim 15, wherein, when incrementing a pointer equaling one of the head pointer or the tail pointer results in the pointer referring to an address that is greater than a last address of the memory, the pointer is set to zero plus a difference between the address that is greater than the last address and the last address.

18. The method of claim 15, further comprising:
determining the write transaction includes an indirect address; and
using the indirect address to determine the first address, wherein the first address is at an offset from an address referred to by the tail pointer, the offset being indicated by the indirect address.

19. The method of claim 15, further comprising:
determining that the write transaction includes a direct address; and
using the direct address as the first address.

20. The method of claim 15, wherein the write transaction is initiated by a host processor.

21. The method of claim 15, wherein the write transaction is initiated by a Direct Memory Access (DMA) engine.

22. The method of claim 15, wherein execution of an instruction stored in the memory causes a DMA engine to move data from a first location to a second location.

23. The method of claim 15, wherein execution of an instruction stored in the memory causes a DMA engine to move additional data into the memory.

\* \* \* \* \*